(12) United States Patent
Wang et al.

(10) Patent No.: US 12,438,379 B2
(45) Date of Patent: Oct. 7, 2025

(54) METHOD AND SYSTEM FOR ENHANCING TRANSIENT STABILITY OF POWER SYSTEM WITH RENEWABLE ENERGY

(71) Applicants: ZHEJIANG UNIVERSITY, Hangzhou (CN); CHINA SOUTHERN POWER GRID CSG ELECTRIC POWER RESEARCH INSTITUTE, Guangzhou (CN)

(72) Inventors: Guoteng Wang, Hangzhou (CN); Wentao Liu, Hangzhou (CN); Ying Huang, Hangzhou (CN); Yan Li, Guangzhou (CN); Baorong Zhou, Guangzhou (CN); Ye Zhang, Guangzhou (CN); Wangqianyun Tang, Guangzhou (CN); Zheng Xu, Hangzhou (CN)

(73) Assignees: ZHEJIANG UNIVERSITY, Hangzhou (CN); CHINA SOUTHERN POWER GRID CSG ELECTRIC POWER RESEARCH INSTITUTE, Guangzhou (CN); China Southern Power Grid Co., Ltd., Guangzhou (CN)

(*) Notice: Subject to any disclaimer, the term of this patent is extended or adjusted under 35 U.S.C. 154(b) by 0 days.

(21) Appl. No.: 18/924,276

(22) Filed: Oct. 23, 2024

(65) Prior Publication Data

US 2025/0047103 A1  Feb. 6, 2025

Related U.S. Application Data

(63) Continuation of application No. PCT/CN2024/109262, filed on Aug. 1, 2024.

(51) Int. Cl.
*H02J 3/40* (2006.01)
*G01R 31/52* (2020.01)

(52) U.S. Cl.
CPC .............. *H02J 3/40* (2013.01); *G01R 31/52* (2020.01); *H02J 2203/20* (2020.01)

(58) Field of Classification Search
CPC ...... H02J 3/40; H02J 2203/20; H02J 2300/28; H02J 3/381; G01R 31/52
See application file for complete search history.

(56) References Cited

U.S. PATENT DOCUMENTS 11,303,579 B1   4/2022   Fan et al.
2020/0335978 A1*  10/2020   Ren .......................... H02J 3/24

FOREIGN PATENT DOCUMENTS

CN   108539737 A   9/2018
CN   115117877 A   9/2022
(Continued)

OTHER PUBLICATIONS

Mohammad Shahidehpour et al, (Voltage-Adaptive Strategy for Transient Stability Enhancement of Power Systems With 100% Renewable Energy), Feb. 16, 2024, pp. 1364-1376 downlaoded from https://ieeexplore.ieee.org/abstract/document/10439068 (Year: 2024).*

(Continued)

*Primary Examiner* — Darrin D Dunn
*Assistant Examiner* — Olvin Lopez Alvarez

(57) ABSTRACT

A method for enhancing transient stability of a renewable energy power system is performed as follows. An external subsystem corresponding to the renewable energy power system is constructed. A first matrix corresponding to the external subsystem based on voltage control is constructed. A second matrix corresponding to the renewable energy power system is generated. A transient stability Lyapunov function corresponding to the renewable energy power system is constructed in real time based on the first matrix and the second matrix. A first control signal corresponding to the renewable energy power system is generated based on (Continued)

Lyapunov's second method. The transient stability of the renewable energy power system is controlled and enhanced in real time based on the first control signal. The first control signal is an adaptive voltage control signal of the renewable energy power system.

7 Claims, 6 Drawing Sheets

(56) References Cited

FOREIGN PATENT DOCUMENTS

| CN | 115566721 | A |   | 1/2023  |            |
|----|-----------|---|---|---------|------------|
| CN | 117113688 | A |   | 11/2023 |            |
| CN | 117369264 | A |   | 1/2024  |            |
| CN | 118232410 | A | * | 6/2024  | H02M 1/126 |
| CN | 118572771 | A | * | 8/2024  | H02J 3/32  |

OTHER PUBLICATIONS

Wikipedia, (Lyapunov stability (2025)) this document teaches the Lyapunov second method, pp. 8, downloaded 2025, downloaded from https://en.wikipedia.org/wiki/Lyapunov_stability (Year: 2025).*

Xiuqiang He et al, "Transient Stability Analysis and Enhancement of Renewable Energy Conversion System During LVRT", 2020, pp. 1612-1623, downloaded from https://ieeexplore.ieee.org/abstract/document/8784269 (Year: 2020).*

Fabio Andrade, et al, "Study of Large-Signal Stability of an Inverter-based Generator using a Lyapunov Function", 2014, pp. 1840-1846, downloaded from https://ieeexplore.ieee.org/abstract/document/7048752 (Year: 2014).*

Souvik Dasgupta et al, "Lyapunov Function-Based Current Controller to Control Active and Reactive Power Flow From a Renewable Energy Source to a Generalized Three-Phase Microgrid System", 2013, pp. 799-813 downloaded from https://ieeexplore.ieee.org/stamp/stamp.jsp?tp=&arnumber=6236149 (Year: 2013).*

* cited by examiner

```
┌─────────────────────────────────────────────────────────────────────┐
│ Constructing an external subsystem corresponding to the renewable energy power system; │
│ and constructing a first matrix corresponding to the external subsystem based on voltage │ ─ S1
│ control; wherein the first matrix is a matrix expression of the external subsystem under │
│                        an ideal voltage control condition                                │
└─────────────────────────────────────────────────────────────────────┘
     │
     │     ┌───────────────────────────────────────────────────────────┐
     │     │ Constructing a grid-forming inverter corresponding to the renewable energy │
     │     │ power system; and creating at least three control loops corresponding to the │
     ├────▶│  grid-forming inverter; wherein the at least three control loops comprise a │ ─ S11
     │     │ virtual synchronization loop, a current inner loop, and a current outer loop │
     │     └───────────────────────────────────────────────────────────┘
     │     ┌───────────────────────────────────────────────────────────┐
     │     │ Generating an output current function corresponding to an output power of │
     ├────▶│    the grid-forming inverter; and establishing a nonlinear system model    │ ─ S12
     │     │ corresponding to the renewable energy power system based on the output     │
     │     │                          current function                                   │
     │     └───────────────────────────────────────────────────────────┘
     │     ┌───────────────────────────────────────────────────────────┐
     │     │ Obtaining a second control signal corresponding to the external subsystem │ ─ S13
     └────▶│                under the ideal voltage control condition                   │
           └───────────────────────────────────────────────────────────┘
     ▼
┌─────────────────────────────────────────────────────────────────────┐
│ Generating a second matrix corresponding to the renewable energy power system; and │
│   constructing a transient stability Lyapunov function corresponding to the renewable │ ─ S2
│ energy power system in real time based on the first matrix and the second matrix; wherein │
│       the second matrix is a matrix expression of the external subsystem under an actual │
│                          voltage control condition                                   │
└─────────────────────────────────────────────────────────────────────┘
                      ┌──────────────────────────────────────────────┐
              ───────▶│    Obtaining the first control signal by calculation     │ ─ S31
                      └──────────────────────────────────────────────┘
     ▼
┌─────────────────────────────────────────────────────────────────────┐
│  Generating a first control signal corresponding to the renewable energy power system │
│   based on Lyapunov's second method; and controlling and enhancing transient stability │
│    of the renewable energy power system in real time based on the first control signal; │ ─ S3
│   wherein the first control signal is an adaptive voltage control signal of the renewable │
│                              energy power system                                      │
└─────────────────────────────────────────────────────────────────────┘
           ┌───────────────────────────────────────────────────────────┐
           │ Generating a short-circuit fault data corresponding to the renewable energy │
           │ power system, and verifying transient stability of the renewable energy power │ ─ S4
           │          system in real time based on the short-circuit fault data            │
           └───────────────────────────────────────────────────────────┘
```

Fig. 5

METHOD AND SYSTEM FOR ENHANCING TRANSIENT STABILITY OF POWER SYSTEM WITH RENEWABLE ENERGY

CROSS-REFERENCE TO RELATED APPLICATIONS

This application is a continuation of International Patent Application No. PCT/CN2024/109262, filed on Aug. 1, 2024. The content of the aforementioned application, including any intervening amendments made thereto, is incorporated herein by reference in its entirety.

TECHNICAL FIELD

This application relates to power systems with renewable energy, and more particularly to a method and system for enhancing transient stability of a renewable energy power system.

BACKGROUND

In recent years, extreme weather events have become more frequent worldwide, making the construction of a low-carbon society increasingly urgent. Increasing the proportion of renewable energy in the primary energy source is crucial for reducing the carbon emission of power systems. Unlike fossil fuels, renewable energy sources, such as wind and solar energy, are typically integrated into the grid via inverters rather than synchronous generators. As the penetration of renewable energy sources continues to grow, the synchronous generators will gradually be replaced by inverters. To promote the progress toward a low-carbon or even zero-carbon society, power grids are required to be operated with 100% renewable energy. However, since the inverter-based generator (IBG)-dominated 100% renewable energy power system differs significantly from the traditional synchronous generator-dominated power systems, the IBG penetration will inevitably pose a great challenge to the transient stability analysis and control of the power system.

In the traditional synchronous generator-dominated power systems, the synchronization between units is naturally achieved through rotor operation, and is an inherent physical characteristic. However, in the 100% renewable energy power system, the synchronization between inverters is related to their electrical outputs, and it is required to specially design a control strategy to ensure the synchronized operation. Regarding the synchronous generator-dominated power systems, the transient stability can be enhanced through the forced excitation of the excitation system. The basic principle of forced excitation control is to provide damping torque for the synchronous generators by raising the bus voltage as much as possible during fault and post-fault conditions. Drawing from the synchronous generator experience for transient stability enhancement, a forced excitation strategy has been proposed to effectively improve the transient stability of renewable energy systems by adjusting the inverter's voltage reference. However, in the 100% renewable energy power system, the bus voltage of inverters may not remain constant under severe fault conditions, and the inverter will be switched to a constant current control mode.

Therefore, to address the technical deficiencies described above, there is an urgent need to design and develop a method and system to enhance transient stability of power systems with renewable energy.

SUMMARY

In view of the deficiencies in the prior art, an object of this application is to provide a method and system for enhancing transient stability of a renewable energy power system, in which the system transient stability can be effectively enhanced by regulating the voltage instruction value of the inverter.

The primary objective of the present disclosure is to provide a method for enhancing transient stability of a renewable energy power system. The secondary objective of the present disclosure is to provide a system for enhancing transient stability of a renewable energy power system.

The primary objective of the present disclosure is achieved as follows. The method for enhancing transient stability of a renewable energy power system, comprising:

(1) constructing an external subsystem corresponding to the renewable energy power system; and constructing a first matrix corresponding to the external subsystem based on voltage control; wherein the first matrix is a matrix expression of the external subsystem under an ideal voltage control condition;

(2) generating a second matrix corresponding to the renewable energy power system; and constructing a transient stability Lyapunov function corresponding to the renewable energy power system in real time based on the first matrix and the second matrix; wherein the second matrix is a matrix expression of the external subsystem under an actual voltage control condition; and (3) generating a first control signal corresponding to the renewable energy power system based on Lyapunov's second method; and controlling and enhancing transient stability of the renewable energy power system in real time based on the first control signal; wherein the first control signal is an adaptive voltage control signal of the renewable energy power system.

In an embodiment, step (1) further comprises:
constructing a grid-forming inverter corresponding to the renewable energy power system; and creating at least three control loops corresponding to the grid-forming inverter; wherein the at least three control loops comprise a virtual synchronization loop, a current inner loop, and a current outer loop; and
generating an output current function corresponding to an output power of the grid-forming inverter; and establishing a nonlinear system model corresponding to the renewable energy power system based on the output current function.

In an embodiment, the output power of the grid-forming inverter is obtained through the following formula:

$$P_{si} = u_{sdi}i_{sdi} + u_{sqi}i_{sqi} = R_{ii}(i_{sdi}^2 + i_{sqi}^2) + \sum_{j=1,j\neq i}^{N}\left[\begin{array}{c}R_{ij}(i_{sqj}i_{sdi} - i_{sdj}i_{sqi}) + \\ X_{ij}(i_{sdi}i_{sdj} + i_{sqi}i_{sqj})\end{array}\right]\sin\delta_{ij} + \sum_{j=1,j\neq i}^{N}\left[\begin{array}{c}R_{ij}(i_{sdj}i_{sdi} + i_{sqj}i_{sqi}) + \\ X_{ij}(i_{sqi}i_{sdj} - i_{sdi}i_{sqj})\end{array}\right]\cos\delta_{ij};$$

wherein $P_{si}$ represents an output power of an i-th grid-forming inverter, $i_{sdi}$ represents a d-axis component of an actual output current of the i-th grid-forming inverter, $i_{sqi}$ represents a q-axis component of the actual output current of the i-th grid-forming inverter, $u_{sdi}$ represents a d-axis component of a bus voltage of the i-th grid-forming inverter, $u_{sqi}$ represents a q-axis component of the bus voltage of the i-th grid-forming inverter, $i_{sdj}$ represents a d-axis component of an actual output current of a j-th grid-forming inverter, $i_{sqj}$ represents a q-axis component of the actual output current of the j-th grid-forming inverter, $u_{sdj}$ represents a d-axis component of a bus voltage of the j-th grid-forming inverter, $u_{sqj}$ represents a q-axis component of the bus voltage of the j-th grid-forming inverter, $R_{ij}$ represents a real part of an element in an i-th row and a j-th column of an impedance matrix, $X_{ij}$ represents an imaginary part of the element in the i-th row and the j-th column of the impedance matrix, and $\delta_{ij}$ represents an angle difference between the i-th grid-forming inverter and the j-th grid-forming inverter.

In an embodiment, step (1) further comprises:

obtaining a second control signal corresponding to the external subsystem under the ideal voltage control condition; wherein the second control signal is obtained through the following formula:

$$v = K_a^T \xi + K_c^T C$$

wherein v represents the second control signal; C represents a coefficient matrix; $\xi$ represents an external variable vector of the renewable energy power system; and $K_a$ and $K_c$ are coefficient matrices of an ideal control scheme.

In an embodiment, the external subsystem is represented by:

$$\dot{\xi} = A\xi + Bv + C;$$

wherein $\xi$ represents an external variable vector of the renewable energy power system; A, B, and C are coefficient matrices; and v represents an auxiliary control signal for individual inverters in the renewable energy power system.

In an embodiment, step (3) further comprises:

obtaining the first control signal by calculation through the following formula:

$$u = A\xi + B\hat{K}_a^T \xi + B\hat{K}_c^T C;$$

wherein u represents the first control signal; A, B, and C are coefficient matrices; $\xi$ represents an external variable vector of the renewable energy power system; and $\hat{K}_a$ and $\hat{K}_c$ are coefficient matrices that satisfy a Lyapunov stability condition.

In an embodiment, after step (3), the method comprises generating a short-circuit fault data corresponding to the renewable energy power system, and verifying transient stability of the renewable energy power system in real time based on the short-circuit fault data.

The second objective of the present disclosure is achieved as follows. The system for enhancing transient stability of a renewable energy power system, comprising:

a first data construction unit;
a second data construction unit; and
a data generation unit;
wherein the first data construction unit is configured for constructing the external subsystem corresponding to the renewable energy power system, and generating the first matrix corresponding to the external subsystem based on voltage control; wherein the first matrix is a matrix expression of the external subsystem under the ideal voltage control condition;

the second data construction unit is configured for generating a second matrix corresponding to the renewable energy power system, and constructing the transient stability Lyapunov function corresponding to the renewable energy power system in real time based on the first matrix and the second matrix; wherein the second matrix is a matrix expression of the external subsystem under an actual voltage control condition; and the data generation unit is configured for generating the first control signal corresponding to the renewable energy power system based on Lyapunov's second method, and controlling and enhancing transient stability of the renewable energy power system in real time based on the first control signal; wherein the first control signal is an adaptive voltage control signal of the renewable energy power system.

In an embodiment, the first data construction unit comprises:

a construction module; and
a data generation module;
wherein the construction module is configured for constructing the grid-forming inverter corresponding to the renewable energy power system, and generating at least three control loops corresponding to the grid-forming inverter; wherein the at least three control loops comprise a virtual synchronization loop, a current inner loop, and a current outer loop; and the data generation module is configured for generating an output current function corresponding to an output power of the grid-forming inverter, and establishing a nonlinear system model corresponding to the renewable energy power system based on the output current function.

In an embodiment, the data generation module is configured for obtaining the output power of the grid-forming inverter through the following formula:

$$P_{si} = u_{sdi}i_{sdi} + u_{sqi}i_{sqi} = R_{ii}(i_{sdi}^2 + i_{sqi}^2) + \sum_{j=1, j \neq i}^{N} \left[ \begin{array}{c} R_{ij}(i_{sqj}i_{sdi} - i_{sdj}i_{sqi}) + \\ X_{ij}(i_{sdi}i_{sdj} + i_{sqi}i_{sqj}) \end{array} \right] \sin \delta_{ij} + \sum_{j=1, j \neq i}^{N} \left[ \begin{array}{c} R_{ij}(i_{sdj}i_{sdi} + i_{sqj}i_{sqi}) + \\ X_{ij}(i_{sqi}i_{sdj} - i_{sdi}i_{sqj}) \end{array} \right] \cos \delta_{ij};$$

wherein $P_{si}$ represents an output power of an i-th grid-forming inverter, $i_{sdi}$ represents a d-axis component of an actual output current of the i-th grid-forming inverter, $i_{sqi}$ represents a q-axis component of the actual output current of the i-th grid-forming inverter, $u_{sdi}$ represents a d-axis component of a bus voltage of the i-th grid-forming inverter, $u_{sqi}$ represents a q-axis component of the bus voltage of the i-th grid-forming inverter, $i_{sdj}$ represents a d-axis component of an actual output current of a j-th grid-forming inverter, $i_{sqj}$ represents a q-axis component of the actual output current of the j-th grid-forming inverter, $u_{sdj}$ represents a d-axis component of a bus voltage of the j-th grid-forming inverter, $u_{sqj}$ represents a q-axis component of the bus voltage of the j-th grid-forming inverter, $R_{ij}$ represents a real part of an element in an i-th row and a j-th column of an impedance matrix, $X_{ij}$ represents an imaginary part of the element in the i-th row and the j-th column of the impedance matrix, and $\delta_{ij}$ represents an angle difference between the i-th grid-forming inverter and the j-th grid-forming inverter.

In an embodiment, the first data construction unit comprises:
a data acquisition module;
wherein the data acquisition module is configured for obtaining a second control signal corresponding to the external subsystem under the ideal voltage control condition; wherein the second control signal is obtained through the following formula:

$$v = K_a^T \xi + K_c^T C;$$

wherein v represents the second control signal; and $K_a$ and $K_c$ are coefficient matrices of an ideal control scheme.

In an embodiment, the data generation unit comprises:
a computation module;
wherein the computation module is configured for obtaining the first control signal by calculation through the following formula:

$$u = A\xi + B\hat{K}_a^T \xi + B\hat{K}_c^T C;$$

wherein u represents the first control signal; and $\hat{K}_a$ and $\hat{K}_c$ are coefficient matrices that satisfy a Lyapunov stability condition.

In an embodiment, the system further comprising:
a verification module;
wherein the verification module is configured for generating a short-circuit fault data corresponding to the renewable energy power system, and verifying transient stability of the renewable energy power system in real time based on the short-circuit fault data.

In an embodiment, the external subsystem is represented by:

$$\dot{\xi} = A\xi + Bv + C;$$

wherein $\xi$ represents an external variable vector of the renewable energy power system; A, B, and C are coefficient matrices; and v represents an auxiliary control signal for individual inverters in the renewable energy power system.

In the present disclosure, an external subsystem corresponding to the renewable energy power system is constructed and a first matrix corresponding to the external subsystem is constructed based on voltage control. The first matrix represents the matrix expression of the external subsystem under the ideal voltage control condition. Further, a second matrix corresponding to the renewable energy power system is generated. Based on the first matrix and the second matrix, a Lyapunov function for transient stability corresponding to the renewable energy power system is constructed in real-time. The second matrix represents the matrix expression of the external subsystem of the renewable energy power system under an actual voltage control condition. Based on Lyapunov's second method, a first control signal corresponding to the renewable energy power system is generated. Using the first control signal to control and enhance the transient stability of the renewable energy power system in real-time. The first control signal represents the adaptive voltage control signal of the renewable energy power system. The disclosure also includes a corresponding system for enhancing the transient stability of the system by adjusting the voltage command value of the inverter.

In other words, through the solution of this present disclosure, an external subsystem of a 100% renewable energy power system is constructed, and the analytical expression of the inverter's voltage control signal is derived based on the Lyapunov theory. This allows for the enhancement of the system's transient stability by modifying the inverter's voltage command value.

BRIEF DESCRIPTION OF THE DRAWINGS

In order to more clearly illustrate the technical solutions in the embodiments of the present disclosure or in the prior art, the accompanying drawings needed in the description of the embodiments or the prior art will be briefly described below. Obviously, presented in the accompanying drawings are only some embodiments of the present disclosure. Other embodiments may also be obtained by those skilled in the art according to these accompanying drawings without making creative effort.

FIG. 5 is a flowchart of the method for enhancing transient stability of a renewable energy power system according to an embodiment of the present disclosure.

DETAILED DESCRIPTION OF EMBODIMENTS

Figure 1:
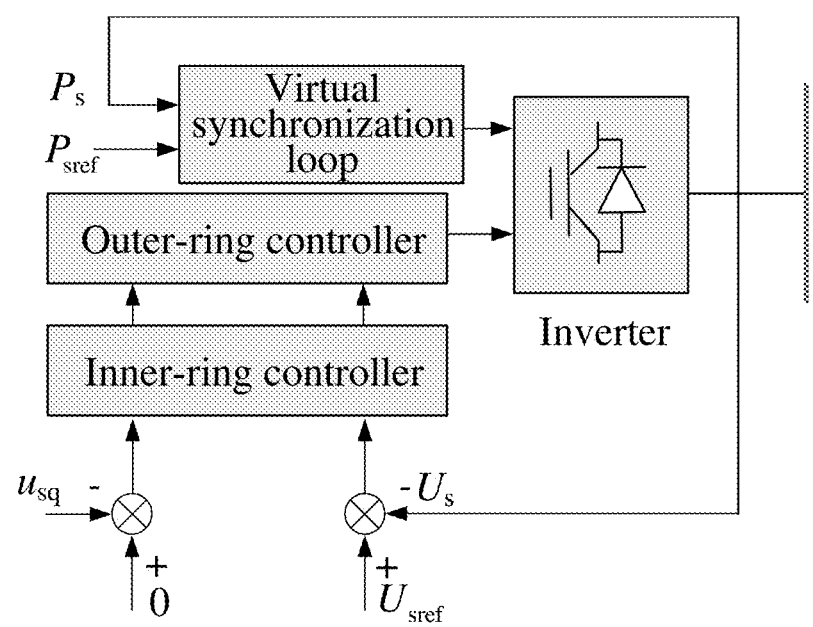
FIG. 1 is a schematic diagram of the inverter for a method for enhancing transient stability of a renewable energy power system according to an embodiment of the present disclosure.

To make the objects, technical solutions and advantages of the embodiments of this application clearer, this application will be clearly and completely described below in conjunction with the accompanying drawings and specific embodiments. Those skilled in the art can easily understand other advantages and effects of the present disclosure from the content disclosed in this specification.

The present disclosure can also be implemented or applied through various other specific embodiments, and the details in this specification can be modified or altered in various ways without departing from the spirit of the present disclosure, based on different perspectives and applications.

It should be noted that if directional indications (such as up, down, left, right, front, back, etc.) are mentioned in the embodiments of the present disclosure, these indications are merely for explaining the relative positional relationships, movement, and other aspects between components in a specific orientation (as shown in the figures). If this specific orientation changes, the directional indications will correspondingly change as well.

Additionally, as used herein, the terms "first", "second", etc. are used only for distinguishment, and are not to be understood as indicating or implying relative importance. Therefore, features designated as "first" and "second" may explicitly or implicitly include at least one of the features. Furthermore, the technical solutions between different embodiments can be combined with one another, but only on the basis that such combinations can be implemented by those skilled in the art. When a combination of technical solutions results in contradictions or cannot be realized, it should be considered that such a combination does not exist and is not within the scope of the disclosure defined by the appended claims.

The present disclosure is described further in conjunction with the accompanying drawings. As shown in FIGS. 1-5, the present disclosure provides a method for enhancing transient stability of a renewable energy power system. The control method includes the following steps.

(S1) An external subsystem corresponding to the renewable energy power system is constructed; and a first matrix corresponding to the external subsystem based on voltage control is constructed. The first matrix is a matrix expression of the external subsystem under an ideal voltage control condition;

(S2) A second matrix corresponding to the renewable energy power system is generated; and a transient stability Lyapunov function corresponding to the renewable energy power system is constructed in real time based on the first matrix and the second matrix. The second matrix is a matrix expression of the external subsystem under an actual voltage control condition.

(S3) A first control signal corresponding to the renewable energy power system is generated based on Lyapunov's second method; and the transient stability of the renewable energy power system is controlled and enhanced in real time based on the first control signal. The first control signal is an adaptive voltage control signal of the renewable energy power system.

The step (S1) includes the following sub-steps.

(S11) A grid-forming inverter corresponding to the renewable energy power system is constructed; and at least three control loops corresponding to the grid-forming inverter are created. The at least three control loops include a virtual synchronization loop, a current inner loop, and a current outer loop.

(S12) An output current function corresponding to an output power of the grid-forming inverter is generated; and a nonlinear system model corresponding to the renewable energy power system is established based on the output current function.

The output power of the grid-forming inverter is obtained through the following formula:

$$P_{si} = u_{sdi}i_{sdi} + u_{sqi}i_{sqi} = R_{ii}(i_{sdi}^2 + i_{sqi}^2) + \sum_{j=1,j\neq i}^{N}\left[\begin{array}{c}R_{ij}(i_{sqj}i_{sdi} - i_{sdj}i_{sqi}) + \\ X_{ij}(i_{sdi}i_{sdj} + i_{sqi}i_{sqj})\end{array}\right]\sin\delta_{ij} + \sum_{j=1,j\neq i}^{N}\left[\begin{array}{c}R_{ij}(i_{sdj}i_{sdi} + i_{sqj}i_{sqi}) + \\ X_{ij}(i_{sqi}i_{sdj} - i_{sdi}i_{sqj})\end{array}\right]\cos\delta_{ij}; \quad (1)$$

In the above formula, $P_{si}$ represents an output power of an i-th grid-forming inverter, $i_{sdi}$ represents a d-axis component of an actual output current of the i-th grid-forming inverter, $i_{sqi}$ represents a q-axis component of the actual output current of the i-th grid-forming inverter, $u_{sdi}$ represents a d-axis component of a bus voltage of the i-th grid-forming inverter, $u_{sqi}$ represents a q-axis component of the bus voltage of the i-th grid-forming inverter, $i_{sdj}$ represents a d-axis component of an actual output current of a j-th grid-forming inverter, $i_{sqj}$ represents a q-axis component of the actual output current of the j-th grid-forming inverter, $u_{sdj}$ represents a d-axis component of a bus voltage of the j-th grid-forming inverter, $u_{sqj}$ represents a q-axis component of the bus voltage of the j-th grid-forming inverter, $R_{ij}$ represents a real part of an element in an i-th row and a j-th column of an impedance matrix, $X_{ij}$ represents an imaginary part of the element in the i-th row and the j-th column of the impedance matrix, and $\delta_{ij}$ represents an angle difference between the i-th grid-forming inverter and the j-th grid-forming inverter.

The step (S1) includes the following sub-steps.

(S13) A second control signal corresponding to the external subsystem under the ideal voltage control condition is obtained. The second control signal is obtained through the following formula:

$$v = K_a^T \xi + K_c^T C; \quad (19)$$

In the above formula, v represents the second control signal; $K_a$ and $K_c$ are coefficient matrices of the ideal control scheme.

The external subsystem is represented by the following formula:

$$\dot{\xi} = A\xi + Bv + C; \quad (31)$$

In the above formula, $\xi$ represents an external subsystem variable of the renewable energy power system; A, B, and C are coefficient matrices, and v is an auxiliary control signal for individual inverters in the renewable energy power system.

The step (S3) includes the following sub-steps.

(S31) The first control signal is obtained through the following formula:

$$u = A\xi + B\hat{K}_a^T \xi + B\hat{K}_c^T C; \quad (30)$$

In the above formula, u represents the first control signal; $\hat{K}_a$ and $\hat{K}_c$ are coefficient matrices that satisfy a Lyapunov stability condition.

After step (S3), the method includes the following steps.

(S4) A short-circuit fault data corresponding to the renewable energy power system is generated and obtained, and the transient stability of the renewable energy power system is verified in real time based on the short-circuit fault data.

Specifically, in the embodiment of the present disclosure, an adaptive voltage control method is provided for enhancing the transient stability of a 100% renewable energy power system. Firstly, an external subsystem of the 100% renewable energy power system is obtained through input-output linearization. An ideal voltage control structure with unknown parameters is assumed, and under this control structure, the external subsystem expression is derived. Based on the differences between the actual expression and the ideal expression of the external subsystem of the 100% renewable energy power system, a Lyapunov function is constructed to evaluate the transient stability of the system, and the adaptive voltage control signal for the 100% renewable energy power system is obtained.

The adaptive voltage control method includes the following steps. (1) The external subsystem of the 100% renewable energy power system is obtained through input-output linearization. (2) The expression of the external subsystem of the 100% renewable energy power system is derived under the ideal voltage control method. (3) The Lyapunov function is constructed to evaluate the system's transient stability based on the differences between the actual and ideal expressions of the external subsystem of the 100% renewable energy power system. (4) The adaptive voltage control signal for the 100% renewable energy power system is obtained using Lyapunov's second method.

In step (1), the external subsystem of the 100% renewable energy power system is obtained through the following formula:

$$\dot{\xi} = A\xi + Bv + C; \quad (31)$$

In the above formula, $\xi$ represents the external subsystem variables of the 100% renewable energy power system; A, B, and C are coefficient matrices; and v represents the auxiliary control signals of individual inverters in the renewable energy power system.

In step (2), the expression of the external subsystem of the 100% renewable energy power system under the ideal voltage control method is derived through the following formula.

The expression of the ideal control signal is as the following formula:

$$v = K_a^T \xi + K_c^T C; \quad (19)$$

The expression of the external subsystem is as the following formula:

$$\dot{\xi} = (A + BK_a^T)\xi + (1 + BK_c^T)C; \quad (20)$$

In the above formula, $K_a$ and $K_c$ are the coefficient matrices of the ideal control scheme.

In step (3), the Lyapunov function for evaluating the transient stability of the 100% renewable energy power system is constructed using the following formula.

The expression of the feasible solution of the controller is as the following formula:

$$v = \hat{K}_a^T \xi + \hat{K}_c^T C; \quad (19)$$

The expression of the external subsystem under the feasible solution is as the following formula:

$$\dot{\xi} = (A + B\hat{K}_a^T)\xi + (I + B\hat{K}_c^T)C; \quad (20)$$

The expression of the Lyapunov function is as the following formula:

$$V(e, \Delta K_a^T, \Delta K_c^T) = e^T P e + tr(\Delta K_a^T \Gamma_a^{-1} \Delta K_a + \Delta K_c^T \Gamma_c^{-1} \Delta K_c); \quad (21)$$

In the above formula, $\hat{K}_a$ and $\hat{K}_c$ represent the coefficient matrices in the feasible solution, $\Delta K_a$ is the difference between the coefficient matrix of the ideal control scheme ($K_a$) and the coefficient matrix of the feasible solution control scheme ($\hat{K}_a$), $\Delta K_c$ is the difference between the coefficient matrix of the ideal control scheme ($K_c$) and the coefficient matrix of the feasible solution control scheme ($\hat{K}_c$), e is the vector formed by the error between the external subsystem variables under the feasible solution and the external subsystem variables under the ideal control scheme, P is a positive-definite matrix, and $\Gamma_a$ and $\Gamma_c$ are diagonal matrices with elements greater than 0.

In step (4), the adaptive voltage control signal for the 100% renewable energy power system is obtained through the following formula.

The expression of the change rate of the coefficient matrices in the feasible solution is as the following formula:

$$\begin{cases} \dot{\hat{K}}_a = -\Gamma_a \xi e^T P B' \\ \dot{\hat{K}}_c = -\Gamma_c C' e^T P B' \end{cases}; \quad (32)$$

The expression of the final control law of the 100% renewable energy power system is as the following formula:

$$u = A\xi + B(\hat{K}_a^T \xi + \hat{K}_c^T C); \quad (30)$$

In the above formula, u represents the voltage reference values of each inverter in the 100% renewable energy power system.

In other words, the present disclosure provides a method for enhancing transient stability of a renewable energy power system and the method includes the following steps.

(1) The external subsystem of the 100% renewable energy power system is obtained through input-output linearization.

The composition of the grid-forming inverter is shown in FIG. 1. The inverter controller includes three control loops: a virtual synchronous loop, an inner current loop, and an outer current loop. In FIG. 1, $P_s$ represents the actual value of the active power output of the inverter, $P_{sref}$ represents the reference value of the active power output of the inverter, Us represents the actual value of the bus voltage of the inverter, $U_{sref}$ represents the reference value of the bus voltage of the inverter, $u_{sq}$ represents the q-axis component of the bus voltage of the inverter.

The output power of the i-th inverter can be written as:

$$P_{si} = u_{sdi} i_{sdi} + u_{sqi} i_{sqi} = \\ R_{ii}(i_{sdi}^2 + i_{sqi}^2) + \sum_{j=1, j \neq i}^{N} \begin{bmatrix} R_{ij}(i_{sqj} i_{sdi} - i_{sdj} i_{sqi}) + \\ X_{ij}(i_{sdi} i_{sdj} + i_{sqi} i_{sqj}) \end{bmatrix} \sin \delta_{ij} + \\ \sum_{j=1, j \neq i}^{N} \begin{bmatrix} R_{ij}(i_{sdj} i_{sdi} + i_{sqj} i_{sqi}) + \\ X_{ij}(i_{sqi} i_{sdj} - i_{sdi} i_{sqj}) \end{bmatrix} \cos \delta_{ij}; \quad (1)$$

In the above formula, $P_{si}$ represents an output power of an i-th grid-forming inverter, $i_{sdi}$ represents a d-axis component of an actual output current of the i-th grid-forming inverter, $i_{sqi}$ represents a q-axis component of the actual output current of the i-th grid-forming inverter, $u_{sdi}$ represents a d-axis component of a bus voltage of the i-th grid-forming inverter, $u_{sqi}$ represents a q-axis component of the bus voltage of the i-th grid-forming inverter, $i_{sdj}$ represents a d-axis component of an actual output current of a j-th grid-forming inverter, $i_{sqj}$ represents a q-axis component of the actual output current of the j-th grid-forming inverter, $u_{sdj}$ represents a d-axis component of a bus voltage of the j-th grid-forming inverter, $u_{sqj}$ represents a q-axis component of the bus voltage of the j-th grid-forming inverter, $R_{ij}$ represents a real part of an element in an i-th row and a j-th column of an impedance matrix, $X_{ij}$ represents an imaginary part of the element in the i-th row and the j-th column of the impedance matrix, and $\delta_{ij}$ represents an angle difference between the i-th grid-forming inverter and the j-th grid-forming inverter.

Based on the above formula, the output power of the inverter can be expressed as a function of the output current of the inverter. Consequently, the model of the 100% renewable energy power system can be written in the standard form of a nonlinear system as the following formula:

$$\begin{cases} \dot{x} = f(x) + g(x)u \\ y = h(x) \end{cases}; \quad (2)$$

In the above formula, x represents a vector composed of state variables, u represents a vector composed of input signals, y represents a vector composed of output signals, f represents a system function vector, g represents an input function vector, and h represents an output function vector. The respective expressions of these vectors are as follows:

$$\begin{cases} x = [x_1, x_2, \ldots, x_N]^T \\ x_i = [\Delta\delta_i, \Delta\omega_i, M_{pUsi}, M_{puqi}, M_{iUsi}, M_{iuqi}]^T \end{cases}; \quad (3)$$

$$\begin{cases} f(x) = [f_1, f_2, \ldots, f_N]^T \\ f_i = \begin{bmatrix} \omega_0 \Delta\omega_i, -\frac{1}{2H_{mi}}\Delta P_{si} - \frac{D_i}{2H_{mi}}\Delta\omega_i, -\frac{k_{pUsi}}{T_{pUsi}}U_{si} - \frac{1}{T_{pUsi}}M_{pUsi}, \\ -\frac{k_{puqi}}{T_{puqi}}u_{sqi} - \frac{1}{T_{puqi}}M_{puqi} - k_{iUsi}U_{si}, -k_{iuqi}u_{sqi} \end{bmatrix}^T \end{cases}; \quad (4)$$

$$\begin{cases} g(x) = \begin{bmatrix} g_1 & 0 & \cdots & 0 \\ 0 & g_2 & \cdots & 0 \\ \vdots & \vdots & \ddots & \vdots \\ 0 & 0 & \cdots & g_N \end{bmatrix} \\ g_i = \left[0, 0, \frac{k_{pUsi}}{T_{pUsi}}, 0, k_{iUsi}, 0\right]^T \end{cases}; \quad (5)$$

$$\begin{cases} u = [U_{sref1}, U_{sref2}, \ldots, U_{srefN}]^T \\ y = [\Delta\delta_1, \Delta\delta_2, \ldots, \Delta\delta_N]^T \end{cases}; \quad (6)$$

In the above formulas, xi represents the vector composed of state variables of the i-th unit, $\Delta\delta_i$ represents the power angle variation of the i-th inverter, $\Delta\omega i$ represents the rotational speed variation of the i-th inverter, $M_{pUsi}$ represents the state variable of the proportional component of the d-axis outer-loop controller of the i-th inverter, $M_{iUsi}$ represents the state variable of the integral component of the d-axis outer-loop controller of the i-th inverter, $M_{puqi}$ represents the state variable of the proportional component of the q-axis outer-loop controller of the i-th inverter, $M_{iuqi}$ represents the state variable of the integral component of the q-axis outer-loop controller of the i-th inverter, $f_i$ represents the vector composed of the system functions of the i-th unit, $\omega 0$ represents the reference rotational speed, $H_{mi}$ represents the inertia time constant of the rotor of the i-th inverter, Di represents the damping coefficient of the i-th inverter, $\Delta P_{si}$ represents the variation of the output power of the i-th inverter, $k_{pUsi}$ represents the proportional coefficient of the d-axis outer-loop controllers of the i-th inverter, $k_{puqi}$ represents the proportional coefficient of the q-axis outer-loop controller of the i-th inverter, $T_{pUsi}$ represents the time constant of the proportional component of the d-axis outer-loop controller of the i-th inverter, $T_{puqi}$ represents the time constant of the proportional component of the q-axis outer-loop controller of the i-th inverter, $U_{si}$ represents the bus voltage magnitude of the i-th inverter, $u_{sqi}$ represents the q-axis component of the bus voltage of the i-th inverter, gi represents the input function vector of the i-th inverter, and $U_{srefi}$ represents the reference voltage value for the i-th inverter.

Since the first-order or second-order Lie derivative of any output $(y_i)$ is zero, the following formula is obtained.

$$\begin{cases} L_{g(:,j)}L_f y_i(x) = 0 \\ L_{g(:,j)}L_f^2 y_i(x) = 0 \end{cases}; \quad (7)$$

In the above formula, $L_{g(:,j)}L_f$ represents the first-order Lie derivative, $L_{g(:,j)}L_f^2$ represents the second-order Lie derivative.

Therefore, using the input-output linearization method, the expression of the external subsystem of the 100% renewable energy power system is as:
wherein:

$$\begin{cases} \dot{\xi}_1 = \xi_2 \\ \dot{\xi}_2 = \xi_3 \\ \dot{\xi}_3 = C(x) + D(x)u \end{cases}; \quad (8)$$

$$C(x) = \begin{bmatrix} L_f^3 y_1(x) \\ \vdots \\ L_f^3 y_N(x) \end{bmatrix}; \quad (9)$$

$$D(x) = \begin{bmatrix} L_{g(:,1)}L_f^2 y_1(x) & \cdots & L_{g(:,N)}L_f^2 y_1(x) \\ \vdots & \ddots & \vdots \\ L_{g(:,1)}L_f^2 y_N(x) & \cdots & L_{g(:,N)}L_f^2 y_N(x) \end{bmatrix}; \quad (10)$$

$$\begin{cases} \xi_1 = [\Delta\delta_1, \Delta\delta_2, \ldots, \Delta\delta_N]^T \\ \xi_2 = \omega_0[\Delta\omega_1, \Delta\omega_2, \ldots, \Delta\omega_N]^T \\ \xi_3 = \omega_0[\Delta\dot{\omega}_1, \Delta\dot{\omega}_2, \ldots, \Delta\dot{\omega}_N]^T \end{cases} \quad (11)$$

(2) The external subsystem expression of the 100% renewable energy power system under ideal voltage control is derived.

During the transient process, changing the voltage reference value $(U_{sref})$ of each inverter can effectively enhance the synchronization stability of the 100% renewable energy power system. This is achieved by designing u to stabilize the external subsystem variable ξ as the following formula:

$$u = A'\xi + B'v; \quad (12)$$

In the above formula, A' and B' represent both coefficient matrices, v represents the new input signal, and the expression of & is as the following formula:

$$\xi = [\xi_1; \xi_2; \xi_3]; \qquad (13)$$

The external subsystem can be rewritten as the following formula:

$$\dot{\xi} = A(x)\xi + B(x)v + C(x); \qquad (14)$$

The expressions for each matrix are given by the following formulas:

$$\begin{cases} A = \begin{bmatrix} 0 & I & 0 \\ 0 & 0 & I \\ D(x) & A' \end{bmatrix} \\ B = [0, 0, D(x)B']^T \\ C = [0, 0, C(x)]^T \end{cases} \qquad (15)$$

(3) A Lyapunov function for evaluating the transient stability of the 100% renewable energy power system is constructed based on the difference between the actual expression and the ideal expression of the external subsystem of the 100% renewable energy power system.

To ensure the transient stability of the 100% renewable energy power system, the control objective is set as follows:

$$\lim_{t \to \infty} \|\xi(t) - \xi_0\| = 0; \qquad (16)$$

In the above formula, $\xi_0$ is the initial value of the variable.

The existence of an ideal control scheme is assumed, as given by the following formula:

$$v = K_a^T \xi + K_c^T C'; \qquad (17)$$

In the above formula, $K_a$ and $K_c$ are the coefficient matrices of the ideal control scheme.

The ideal control scheme is substituted into the external subsystem to yield the following formula:

$$\dot{\xi} = (A + BK_a^T)\xi + (I + BK_c^T)C; \qquad (18)$$

However, in reality, the appropriate settings for the coefficient matrices ($K_a$ and $K_c$) in the ideal control scheme are unknown. Therefore, a feasible solution for the controller is established as the following formula:

$$v = \hat{K}_a^T \xi + \hat{K}_c^T C; \qquad (19)$$

In the above formula, $\hat{K}_a$ and $\hat{K}_c$ are the coefficient matrices in the feasible solution.

The feasible solution is substituted into the external subsystem to yield the following formula:

$$\dot{\xi} = (A + B\hat{K}_a^T)\xi + (I + B\hat{K}_c^T)C; \qquad (20)$$

A Lyapunov function is defined as follows:

$$V(e, \Delta K_a^T, \Delta K_c^T) = e^T P e + tr(\Delta K_a^T \Gamma_a^{-1} \Delta K_a + \Delta K_c^T \Gamma_c^{-1} \Delta K_c); \qquad (21)$$

In the above formula, $\Gamma_a$ and $\Gamma_c$ represent diagonal matrices with all elements greater than zero; $\Delta K_a$ and $\Delta K_c$ represent the difference matrices between the coefficient matrix of the ideal control scheme and the coefficient matrix of the feasible solution, tr(·) represents the trace of the matrix, the expression for e is given by:

$$e = \xi(t) - \xi_0; \qquad (22)$$

P is a positive definite matrix and satisfies the following formula:

$$PA_{ref} + A_{ref}^T P = -Q; \qquad (23)$$

In the above formula, $A_{ref}$ represents the ideal system matrix under the ideal control scheme; and Q is a positive definite matrix, which is taken as the identity matrix here.

(4) Based on Lyapunov's second method, the adaptive voltage control signal for the 100% renewable energy power system is derived as the following formula:

By calculating the derivative of the Lyapunov function V, with respect to time, the following formula is obtained:

$$\dot{V} = \dot{e}^T P e + e^T P \dot{e} + 2tr\left(\Delta K_a^T \Gamma_a^{-1} \dot{\hat{K}}_a + \Delta K_c^T \Gamma_c^{-1} \dot{\hat{K}}_c\right) \qquad (24)$$

The expression for e is substituted into the above formula to obtain the following formula:

$$\dot{V} = \left(A_{ref} e + B \Delta K_a^T \xi + B' \Delta K_c^T C\right)^T P e + e^T \left(A_{ref} e + B \Delta K_a^T \xi + B \Delta K_c^T C\right) + \qquad (25)$$
$$2 tr\left(\Delta K_a^T \Gamma_a^{-1} \dot{\hat{K}}_a + \Delta K_c^T \Gamma_c^{-1} \dot{\hat{K}}_c\right) = e^T \left(A_{ref}^T P + P A_{ref}\right)e +$$
$$2e^T P \left(B \Delta K_a^T \xi + B \Delta K_c^T C\right) + 2 tr\left(\Delta K_a^T \Gamma_a^{-1} \dot{\hat{K}}_a + \Delta K_c^T \Gamma_c^{-1} \dot{\hat{K}}_c\right);$$

Additionally, based on the properties of the trace of the matrix, the following equation is obtained:

$$\begin{cases} e^T P B \Delta K_a^T \xi = tr\left(\Delta K_a^T \xi e^T P B\right) \\ e^T P B \Delta K_c^T C = tr\left(\Delta K_c^T C e^T P B\right) \end{cases}; \qquad (26)$$

The above equation is substituted into the derivative of the Lyapunov function V with respect to time, the following formula is obtained through further simplification as the following formula:

$$\dot{V} = -e^T Q e + 2 tr\left[\Delta K_a^T \left(\xi e^T P B + \Gamma_a^{-1} \dot{\hat{K}}_a\right)\right] + +2 tr\left[\Delta K_c^T \left(C e^T P B + \Gamma_c^{-1} \dot{\hat{K}}_c\right)\right]; \qquad (27)$$

To ensure that the derivative of the Lyapunov function V is negative definite, the Lyapunov stability condition is derived as the following formula:

$$\begin{cases} \dot{\hat{K}}_a = -\Gamma_a \xi e^T PB \\ \dot{\hat{K}}_c = -\Gamma_c C e^T PB \end{cases} \quad (28)$$

The above equation is substituted into the derivative of the Lyapunov function V with respect to time to yield the following formula:

$$\dot{V} = -e^T Q e \leq 0; \quad (29)$$

Only when e=0, $\dot{V}$=0.

Therefore, when the change rate of the two coefficient matrices in the feasible solution of the controller satisfies the Lyapunov stability condition, it ensures that the Lyapunov function V is positive definite and $\dot{V}$ is negative definite, and the system is stable. The final control law of the system is derived as the following formula:

$$u = A\xi + B\hat{K}_a^T \xi + B\hat{K}_c^T C \quad (30)$$

In the above formula, the coefficient matrices and ($\hat{K}_a$ and $\hat{K}_c$) only need to satisfy the Lyapunov stability condition.

Figure 2:
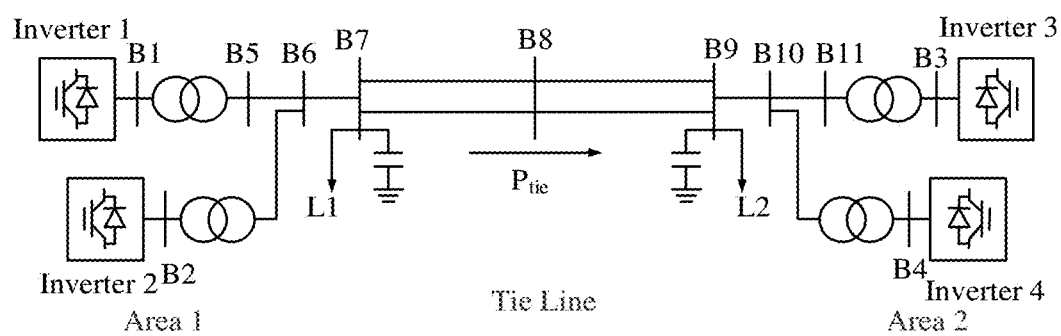
FIG. 2 is a schematic diagram of an 11-node system with 100% renewable energy penetration according to an embodiment of the present disclosure.
Figure 3:
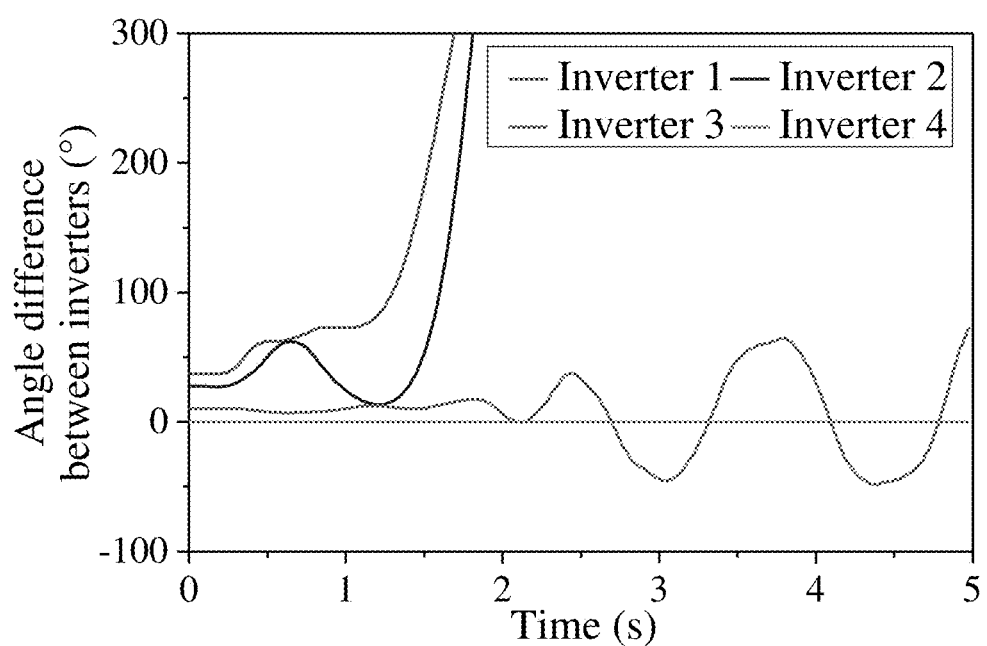
FIG. 3 schematically illustrates the instability result of the system before applying an adaptive voltage control method according to an embodiment of the present disclosure.
Figure 4:
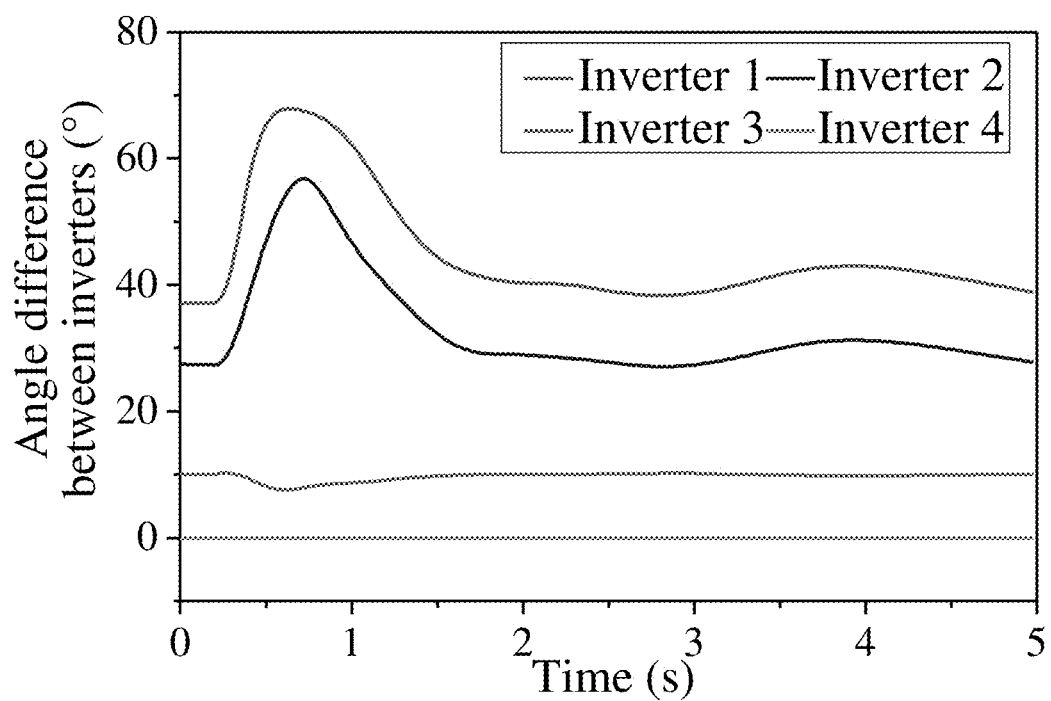
FIG. 4 schematically illustrates the stability result of the system after applying the adaptive voltage control method according to an embodiment of the present disclosure.

(5) Example verification: The modified IEEE 11-bus system is used for validation. In the IEEE 11-bus system, the original four synchronous machines are replaced by inverters while maintaining the original power output, and the long tie line between the two areas is extended to twice its original length. The topology of the modified IEEE 11-bus system is shown in FIG. 2. Before applying the adaptive voltage control method, a short-circuit fault is introduced at bus 7, with a duration of 100 ms, and the response curves of each inverter are shown in FIG. 3. As can be seen from FIG. 3, the system has already experienced transient instability, reflected in the continuously increasing relative phase angle between the two areas, failing to return to a steady-state value. After applying the adaptive voltage control method, the same fault is introduced, and the response curves of each inverter are shown in FIG. 4. Comparing FIGS. 3 and 4, it can be seen that the adaptive voltage control method effectively enhances the transient stability of the 100% renewable energy power system.

Figure 6:
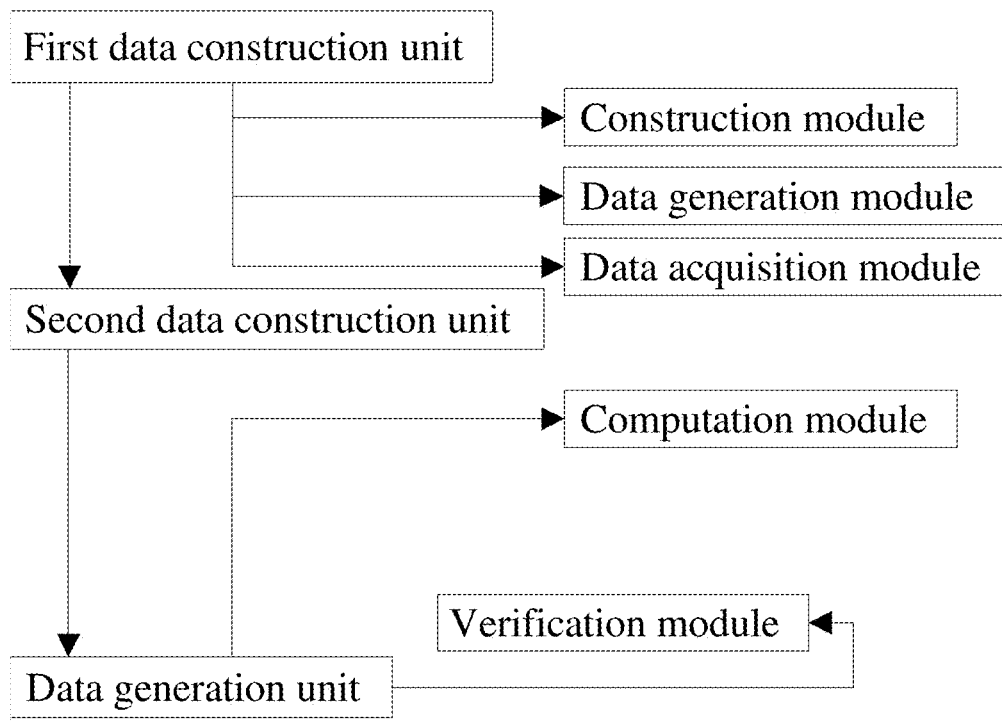
FIG. 6 is a schematic diagram of the structure of the system for enhancing transient stability of a renewable energy power system according to an embodiment of the present disclosure.

To achieve the above objectives, the present disclosure also provides a system for enhancing transient stability of a renewable energy power system, as shown in FIG. 6. The system is to implement aforementioned method for enhancing transient stability of a renewable energy power system, and the system includes the following units.

The first data construction unit is configured for constructing the external subsystem corresponding to the renewable energy power system, and generating the first matrix corresponding to the external subsystem based on voltage control; wherein the first matrix is a matrix expression of the external subsystem under the ideal voltage control condition;

The second data construction unit is configured for generating a second matrix corresponding to the renewable energy power system, and constructing the transient stability Lyapunov function corresponding to the renewable energy power system in real time based on the first matrix and the second matrix; wherein the second matrix is a matrix expression of the external subsystem under an actual voltage control condition; and The data generation unit is configured for generating the first control signal corresponding to the renewable energy power system based on Lyapunov's second method, and controlling and enhancing transient stability of the renewable energy power system in real time based on the first control signal; wherein the first control signal is an adaptive voltage control signal of the renewable energy power system.

The data generation module is configured for obtaining the output power of the grid-forming inverter through the following formula:

$$P_{si} = $$

$$u_{sdi}i_{sdi} + u_{sqi}i_{sqi} = R_{ii}(i_{sdi}^2 + i_{sqi}^2) + \sum_{j=1, j\neq i}^{N} \left[ \begin{array}{c} R_{ij}(i_{sqj}i_{sdi} - i_{sdi}i_{sqi}) + \\ X_{ij}(i_{sdi}i_{sdj} + i_{sqi}i_{sqj}) \end{array} \right] \sin \delta_{ij} + $$

$$\sum_{j=1, j\neq i}^{N} \left[ \begin{array}{c} R_{ij}(i_{sdj}i_{sdi} + i_{sqj}i_{sqi}) + \\ X_{ij}(i_{sqi}i_{sdj} - i_{sqi}i_{sqj}) \end{array} \right] \cos \delta_{ij};$$

In the above formula, $P_{si}$ represents an output power of an i-th grid-forming inverter, $i_{sdi}$ represents a d-axis component of an actual output current of the i-th grid-forming inverter, $i_{sqi}$ represents a q-axis component of the actual output current of the i-th grid-forming inverter, $u_{sdi}$ represents a d-axis component of a bus voltage of the i-th grid-forming inverter, $u_{sqi}$ represents a q-axis component of the bus voltage of the i-th grid-forming inverter, $i_{sdj}$ represents a d-axis component of an actual output current of a j-th grid-forming inverter, $i_{sqj}$ represents a q-axis component of the actual output current of the j-th grid-forming inverter, $u_{sdj}$ represents a d-axis component of a bus voltage of the j-th grid-forming inverter, $u_{sqj}$ represents a q-axis component of the bus voltage of the j-th grid-forming inverter, $R_{ij}$ represents a real part of an element in an i-th row and a j-th column of an impedance matrix, $X_{ij}$ represents an imaginary part of the element in the i-th row and the j-th column of the impedance matrix, and $\delta_{ij}$ represents an angle difference between the i-th grid-forming inverter and the j-th grid-forming inverter.

The first data construction unit includes a data acquisition module. The data acquisition module is configured for obtaining a second control signal corresponding to the external subsystem under the ideal voltage control condition; wherein the second control signal is obtained through the following formula:

$$v = K_a^T \xi + K_c^T C;$$

In the above formula, v represents the second control signal; and $K_a$ and $K_c$ are coefficient matrices of an ideal control scheme.

The data generation unit includes a computation module. The computation module is configured for obtaining the first control signal by calculation through the following formula:

$$u = A\xi + B\hat{K}_a^T \xi + B\hat{K}_c^T C;$$

In the above formula, u represents the first control signal; and $\hat{K}_a$ and $\hat{K}_c$ are coefficient matrices that satisfy a Lyapunov stability condition.

The system further includes a verification module. The verification module is configured for generating a short-circuit fault data corresponding to the renewable energy power system, and verifying transient stability of the renewable energy power system in real time based on the short-circuit fault data.

The external subsystem is represented by:

$$\dot{\xi} = A\xi + Bv + C;$$

In the above formula, $\xi$ represents an external variable vector of the renewable energy power system; A, B, and C are coefficient matrices; and v represents an auxiliary control signal for individual inverters in the renewable energy power system.

In the present disclosure, an external subsystem corresponding to the renewable energy power system is constructed and a first matrix corresponding to the external subsystem is constructed based on voltage control. The first matrix represents the matrix expression of the external subsystem under the ideal voltage control condition. Further, a second matrix corresponding to the renewable energy power system is generated. Based on the first matrix and the second matrix, a Lyapunov function for transient stability corresponding to the renewable energy power system is constructed in real-time. The second matrix represents the matrix expression of the external subsystem of the renewable energy power system under an actual voltage control condition. Based on Lyapunov's second method, a first control signal corresponding to the renewable energy power system is generated. Using the first control signal to control and enhance the transient stability of the renewable energy power system in real-time. The first control signal represents the adaptive voltage control signal of the renewable energy power system. The disclosure also includes a corresponding system for enhancing the transient stability of the system by adjusting the voltage command value of the inverter.

In other words, through the solution of this present disclosure, an external subsystem of a 100% renewable energy power system is constructed, and the analytical expression of the inverter's voltage control signal is derived based on the Lyapunov theory. This allows for the enhancement of the system's transient stability by modifying the inverter's voltage command value.

The present disclosure has been described in detail above with reference to several embodiments, but is not limited thereto. It should be noted that for those skilled in the art, various modifications and improvements can still be made to the technical features recited in the above embodiments. It should be understood that those modifications and improvements made without departing from the scope of the present disclosure shall fall within the scope of the present disclosure defined by the appended claims.

What is claimed is:

1. A method for enhancing transient stability of a renewable energy power system, comprising:

(1) constructing an external subsystem corresponding to the renewable energy power system; and constructing a first matrix corresponding to the external subsystem based on voltage control; wherein the first matrix is a matrix expression of the external subsystem under an ideal voltage control condition;

(2) generating a second matrix corresponding to the renewable energy power system; and constructing a transient stability Lyapunov function corresponding to the renewable energy power system in real time based on the first matrix and the second matrix; wherein the second matrix is a matrix expression of the external subsystem under an actual voltage control condition; and (3) generating a first control signal corresponding to the renewable energy power system based on Lyapunov's second method; and detecting, by at least one sensor of the renewable energy power system, a deviation of an output voltage from a predetermined threshold, and adjusting, by a control system of an inverter, a voltage reference value of the inverter in real time based on the first control signal, thereby controlling and enhancing transient stability of the renewable energy power system; wherein the first control signal is an adaptive voltage control signal of the renewable energy power system.

2. The method of claim 1, wherein step (1) further comprises:

constructing a grid-forming inverter corresponding to the renewable energy power system; and creating at least three control loops corresponding to the grid-forming inverter; wherein the at least three control loops comprise a virtual synchronization loop, a current inner loop, and a current outer loop; and generating an output current function corresponding to an output power of the grid-forming inverter; and establishing a nonlinear system model corresponding to the renewable energy power system based on the output current function.

3. The method of claim 2, wherein the output power of the grid-forming inverter is obtained through the following formula:

$$P_{si} = u_{sdi}i_{sdi} + u_{sqi}i_{sqi} = R_{ii}\left(i_{sdi}^2 + i_{sqi}^2\right) + \sum_{j=1,j\neq i}^{N}\left[\begin{array}{l}R_{ij}(i_{sqj}i_{sdi} - i_{sdi}i_{sqi}) + \\ X_{ij}(i_{sdi}i_{sdj} + i_{sqi}i_{sqj})\end{array}\right]\sin\delta_{ij} + \sum_{j=1,j\neq i}^{N}\left[\begin{array}{l}R_{ij}(i_{sdj}i_{sdi} + i_{sqi}i_{sqi}) + \\ X_{ij}(i_{sqi}i_{sdj} - i_{sqi}i_{sqj})\end{array}\right]\cos\delta_{ij};$$

wherein $P_{si}$ represents an output power of an i-th grid-forming inverter, $i_{sdi}$ represents a d-axis component of an actual output current of the i-th grid-forming inverter, $i_{sqi}$ represents a q-axis component of the actual output current of the i-th grid-forming inverter, $u_{sdi}$ represents a d-axis component of a bus voltage of the i-th grid-forming inverter, $u_{sqi}$ represents a q-axis component of the bus voltage of the i-th grid-forming inverter, $i_{sdj}$ represents a d-axis component of an actual output current of a j-th grid-forming inverter, $i_{sqj}$ represents a q-axis component of the actual output current of the j-th grid-forming inverter, $R_{ij}$ represents a real part of an element in an i-th row and a j-th column of an impedance matrix, $R_{ij}$ represents a real part of an element in the i-th row and an i-th column of the impedance matrix, $X_{ij}$ represents an imaginary part of the element in the i-th row and the j-th column of the impedance matrix, and $\delta_{ij}$ represents an angle difference between the i-th grid-forming inverter and the j-th grid-forming inverter.

4. The method of claim 1, wherein step (1) further comprises:
obtaining a second control signal corresponding to the external subsystem under the ideal voltage control condition; wherein the second control signal is obtained through the following formula:

$$v = K_a^T \xi + K_c^T C;$$

wherein v represents the second control signal; C represents a coefficient matrix; $\xi$ represents an external variable vector of the renewable energy power system; and $K_a$ and $K_c$ are coefficient matrices of an ideal control scheme.

5. The method of claim 4, wherein the external subsystem is represented by:

$$\dot{\xi} = A\xi + Bv + C;$$

wherein $\xi$ represents the external variable vector of the renewable energy power system; A, B, and C are coefficient matrices; and v represents an auxiliary control signal for individual inverters in the renewable energy power system.

6. The method of claim 1, wherein step (3) further comprises:
obtaining the first control signal by calculation through the following formula:

$$u = A\xi + B\hat{K}_a^T \xi + B\hat{K}_c^T C;$$

wherein u represents the first control signal; A, B, and C are coefficient matrices; $\xi$ represents an external variable vector of the renewable energy power system; and $\hat{K}_a$ and $\hat{K}_c$ are coefficient matrices that satisfy a Lyapunov stability condition.

7. The method of claim 1, further comprising:
after step (3), generating a short-circuit fault data corresponding to the renewable energy power system, and verifying transient stability of the renewable energy power system in real time based on the short-circuit fault data.

* * * * *